United States Patent
Aleksic et al.

(10) Patent No.: US 6,175,368 B1
(45) Date of Patent: Jan. 16, 2001

(54) METHOD AND APPARATUS FOR OBJECT RENDERING INCLUDING BUMP MAPPING

(75) Inventors: Milivoje Aleksic, Richmond Hill; Daniel Wong, North York, both of (CA)

(73) Assignee: ATI Technologies, Inc., Thornhill (CA)

( * ) Notice: Under 35 U.S.C. 154(b), the term of this patent shall be extended for 0 days.

(21) Appl. No.: 09/047,181

(22) Filed: Mar. 24, 1998

(51) Int. Cl.$^7$ .................................................... G06T 11/40
(52) U.S. Cl. .......................... 345/430; 345/429; 345/426
(58) Field of Search ..................... 345/430, 431, 345/429, 426

(56) References Cited

U.S. PATENT DOCUMENTS 5,544,292 * 8/1996 Winser ................................. 345/430

\* cited by examiner

*Primary Examiner*—Mark Zimmerman
*Assistant Examiner*—Philip H. Stevenson
(74) *Attorney, Agent, or Firm*—Markison & Reckamp, P.C.

(57) ABSTRACT

A method and apparatus for rendering an object to have a bump texture begins when object parameters for the object are received. The object parameters include bump mapping coordinates and physical display coordinates. From this information, a first and second axis specific tables are generated to provide a plurality of axis specific bump intensity values. The first axis specific table relates to bump intensity values along a first axis of the bump and the second axis specific table relates to bump intensity values along a second axis of the bump map. In essence, the axis specific tables represent the bump map being mathematically repositioned to be in the same plane, with respect to the fixed coordinates of the display, as that of the object. With the tables generated, the object is rendered on a pixel by pixel basis, wherein the first and second axis specific tables are addressed for each pixel to retrieve a corresponding first and second intensity values (i.e., $B_u \times (fu \cdot L)$, $B_v \times (fv \cdot L)$). The first and second intensity values are combined to produce a bump-shading component, or bump intensity value, ($\Delta N \cdot L$) for the given pixel. The bump-shading component ($\Delta N \cdot L$) is then combined with the normal shading component ($N \cdot L$) to produce the shading function for the given pixel. The resulting shading function is then combined with rendered pixel data to produce the resultant display, or pixe,l data for the given pixel.

30 Claims, 10 Drawing Sheets

METHOD AND APPARATUS FOR OBJECT RENDERING INCLUDING BUMP MAPPING

TECHNICAL FIELD OF THE INVENTION

This invention relates generally to video graphic circuitry and more particularly to video graphics circuits that include bump mapping.

BACKGROUND OF THE INVENTION

Computer systems are known to include a central processing unit, system memory, video graphic processing circuitry, audio processing circuitry, and peripheral ports. The peripheral ports allow the central processing unit to access peripheral devices such as monitors, printers, external tape drives, video sources, etc., to facilitate execution of computer applications such as word processing applications, drawing and/or painting applications, spreadsheet applications, video games, broadcast television signals, cable television signals, etc. For example, as the central processing unit processes an application, it provides image data to the video graphics circuitry, which, in turn, processes the image data and provides processed image data to a monitor.

At a minimum, the image data provided by the central processing unit includes physical coordinates of an object with respect to the display coordinates and color information. The basic information is typical for displaying a two-dimensional image that is commonly found in a word processing application, drafting application, presentation application, etc. For more complex display options, such as three-dimensional imagery, the image data (i.e., object parameters) may further include texture coordinates, alpha-blending parameters, and bump map coordinates. The texture coordinates correlate the object to a particular texture map such that the object's surface has the pattern of the texture map. The alpha-blending parameter indicates the translucency of the object. If the object is solid (i.e., not translucent), the alpha-blending value will be a one. If the object is translucent, the alpha-blending parameter will indicate the level of translucency in the range of 0 (e.g., transparent) to 1 (e.g., solid).

The bump map coordinates relate the object to a bump map, which includes a topological representation of roughness that may be imposed upon the surface of the object. In general, providing a "bumped" surface, which may be referred to as applying a shading function, on an object is done on a pixel by pixel basis. The bumping process (i.e., providing an appearance of roughness to a surface) begins by determining a normal vector (N) of the object, where the normal vector is perpendicular to the planer surface of the object. Next, a bump vector (ΔN) is determined by using the partial derivatives at a point o (the mapping coordinates) on the surface along the u and v directions (u and v are the axes of the bump surface), the partial derivatives obtain the normal vector N as N=$O_u$×$O_v$ and defined two additional vectors ζ=N×$O_v$, τ=N×$O_u$ to form a local coordinate system. Then perturbation ΔN is defined as ΔN=$B_u$ζ−$B_v$τ where $B_u$ and $B_v$ are the partial derivatives of the bump map B(u, v). Note that ΔN is a vector in the plane of ζ and τ, which implies it is also on the surface. The shading results from the Lambertian shading formula:

$$\frac{(N + \Delta N) \cdot L}{|N + \Delta N| \times |L|} = \frac{N \cdot L}{|N + \Delta N| \times |L|} + \frac{\Delta N \cdot L}{|N + \Delta N| \times |L|}$$

These mathematical steps must be taken for each pixel of the object to apply the shading function to the object. Due to the complex nature of the equations and the processing power required to execute them, bump mapping is cost prohibitive for all but the very high-end computer products that have significant memory and processing resources.

Therefore, a need exists for a method and apparatus the provides bump mapping of an object without the computational overhead of existing bump mapping techniques.

DETAILED DESCRIPTION OF A PREFERRED EMBODIMENT

Generally, the present invention provides a method and apparatus for rendering an object to have a bump texture. The bump mapping process begins when object parameters for the object are received. The object parameters include bump mapping coordinates and physical display coordinates. From this information, a first and second axis specific tables are generated to provide a plurality of axis specific bump intensity values. The first axis specific table relates to bump intensity values along a first axis of the bump and the second axis specific table relates to bump intensity values along a second axis of the bump map. In essence, the axis specific tables represent the bump map being mathematically repositioned to be in the same plane, with respect to the fixed coordinates of the display, as that of the object. With the tables generated, the object is rendered on a pixel by pixel basis, wherein the first and second axis specific tables are addressed for each pixel to retrieve a corresponding first and second intensity values (i.e., $B_u$×(fu·L), $B_v$×(fv·L)). The first and second intensity values are combined to produce a bump-shading component, or bump intensity value, (ΔN·L) for the given pixel.

The bump-shading component (ΔN·L) is then combined with the normal shading component (N·L) to produce the shading function for the given pixel. The resulting shading function is then combined with rendered pixel data to produce the resultant display, or pixel, data for the given pixel. With such a method and apparatus, the computational overhead of providing bump mapping is substantially reduced. This reduction occurs because the bump intensity value, or bump shading function, is derived from a table look-up as opposed to being calculated on a pixel-by-pixel basis. The table look-up accesses two one-dimensional tables, one for a first axis of the bump map and another for a second axis, where the bump map has been mathematically repositioned to lie in the plane of the object being rendered. By repositioning the bump map, only two vector calculations are needed to populate the tables, one calculation for each table.

Figure 1:
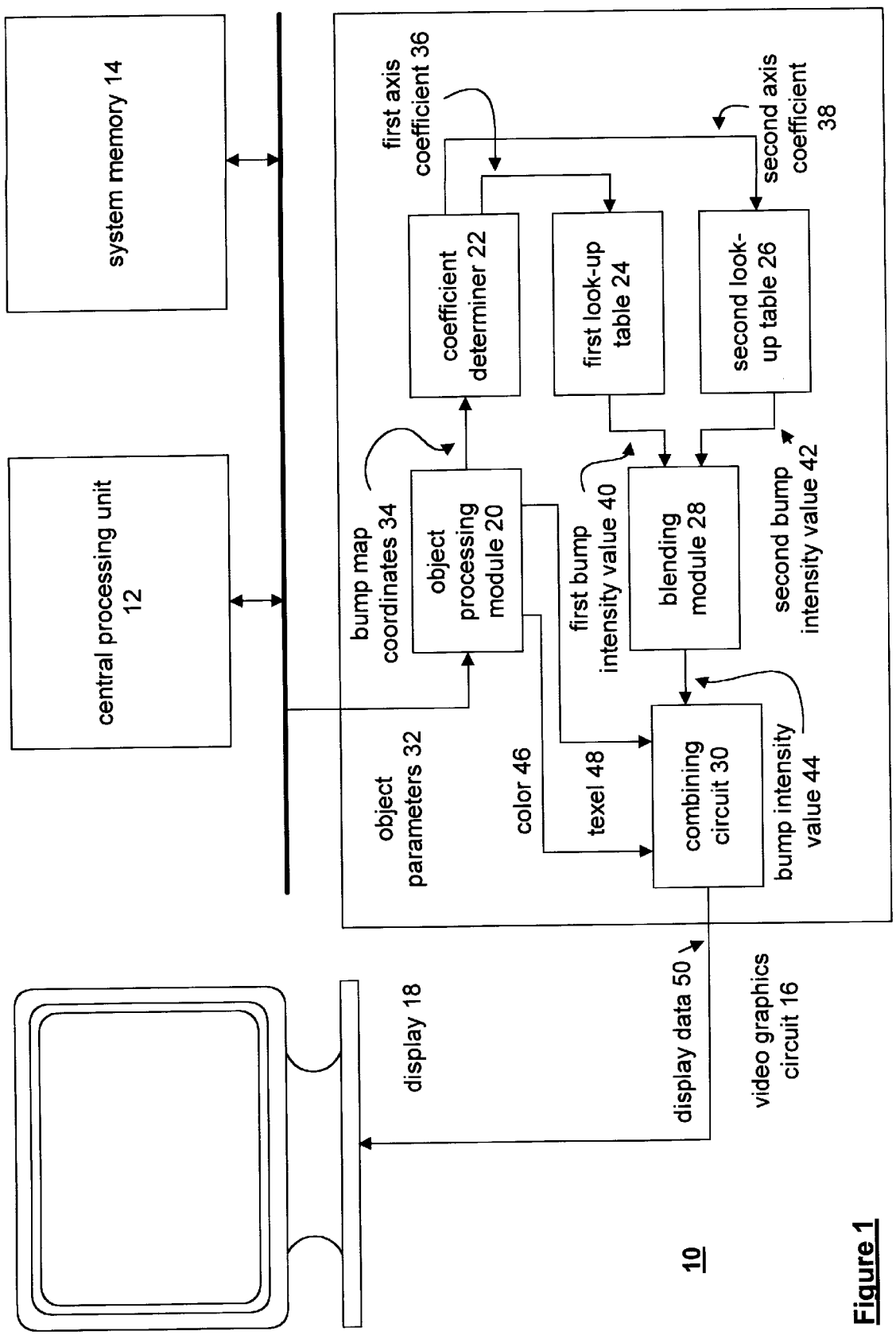
FIG. 1 illustrates a schematic block diagram of a computing system that is in accordance with the present invention.

The present invention can be more fully described with reference to FIGS. 1 through 10. FIG. 1 illustrates a schematic block diagram of a computing system 10 that includes a central processing unit 12, system memory 14, a video graphics circuit 16, and a display 18. The central processing unit 12, the system memory 14 and the video graphics circuit 16 are operably coupled via a system bus. The central processing unit may be a single processing unit or a plurality of processing units similar to those found in laptop computers, personal computers, workstations, and/or any other computational device. The system memory 14 may be read-only memory, random access memory, floppy disk memory, hard disk memory, any device that stores digital information or any combination thereof. The display 18 may be a CRT monitor, television, flat panel LCD display, or a plurality of such displays. Note that depending on the type of display, the display data 50 will be different. For example, if the display 18 is a CRT monitor, the display data 50 will be RGB pixel data, which may be 8 bits, 16 bits or 32 bits in length. If, however, the display 18 is a television, the display data 50 will be YUV data, or YCrCb data. Alternatively, if the display 18 is an LCD flat panel, the display data will be three-bit RGB data and may be provided to the display in a dual scan mode.

The video graphics circuit 16 includes an object processing module 20, a coefficient determiner 22, a first lookup table 24, a second lookup table 26, a blending module 28, and a combining circuit 30. The object processing module 20 receives object parameters 32 from the central processing unit and/or other image generating source, such as a television encoder. The object parameters 32 include the physical coordinates of the object, bump map coordinates of the object, and presentation criteria of the object. The presentation criterion of the object includes texture coordinates, color data at the vertexes of the object, and/or alpha blending information. The object processing module 20 is operable to receive the object parameters and generate, therefrom, color information 46 and texels 48 for each pixel of the object. In addition, the object processing module 20 provides the bump mapping coefficients 34, on a pixel by pixel basis, to the coefficient determiner 22.

The coefficient determiner 22 utilizes the bump map coordinates 34 to access a bump map, which may be a texture map including bump coefficients, or perturbation coefficients. Based on the bump map coordinates 34, the coefficient determiner 22 retrieves a first access coefficient 36 and a second access coefficient 38 and provides them to the first and second look-up tables 24 and 26. The first look-up table 24 utilizes the first access coefficient 36 to retrieve a first bump intensity value 40, while the second look-up table 26 uses the second access coefficient 38 to retrieve a second bump intensity value 42. The first bump intensity value 40 may be represented by the equation $B_u \times (fu \cdot L)$, where $B_u$ represents the first coefficient 36, fu represents a vector of the first axis of the bump map when repositioned to the plane of the object, and L represents at least one light vector. The second bump intensity value 42 by the equation $B_v \times (fu \cdot L)$, where $B_v$ represents the second coefficient 38, fv represents a vector of the second axis of the bump map when repositioned to the plane of the object, and L represents at least one light vector.

The blending module 28 receives the first bump intensity value 40 and the second bump intensity value 42 and produces therefrom a bump intensity value 44. Since the first and second bump intensity values 40 and 42 are separable entities, the blending module can add the values together to obtain the bump intensity value 44 (ΔN·L). As such, the bump intensity value 44 equals $(B_u \times (fu \cdot L) + B_v \times (fu \cdot L))$.

The combining circuit 30 receives the color information 46, the texel information 48 and the bump intensity value 44. In addition, the combining circuit 30 receives a normal shading function (N·L) and combines the normal shading function with the bump intensity value 44 to obtain a resulting shading function (N·L)+(ΔN·L). The combining circuit 30 then combines the resulting shading function with the color information 46, and the texel information 48 to produce display data 50 for a given pixel. As such, the present invention provides a method and apparatus that allows bump mapping to be determined on a pixel by pixel basis without the computational overhead of prior bump mapping techniques. Thus, making bump mapping a viable feature for commercial grade computers.

Figure 2:
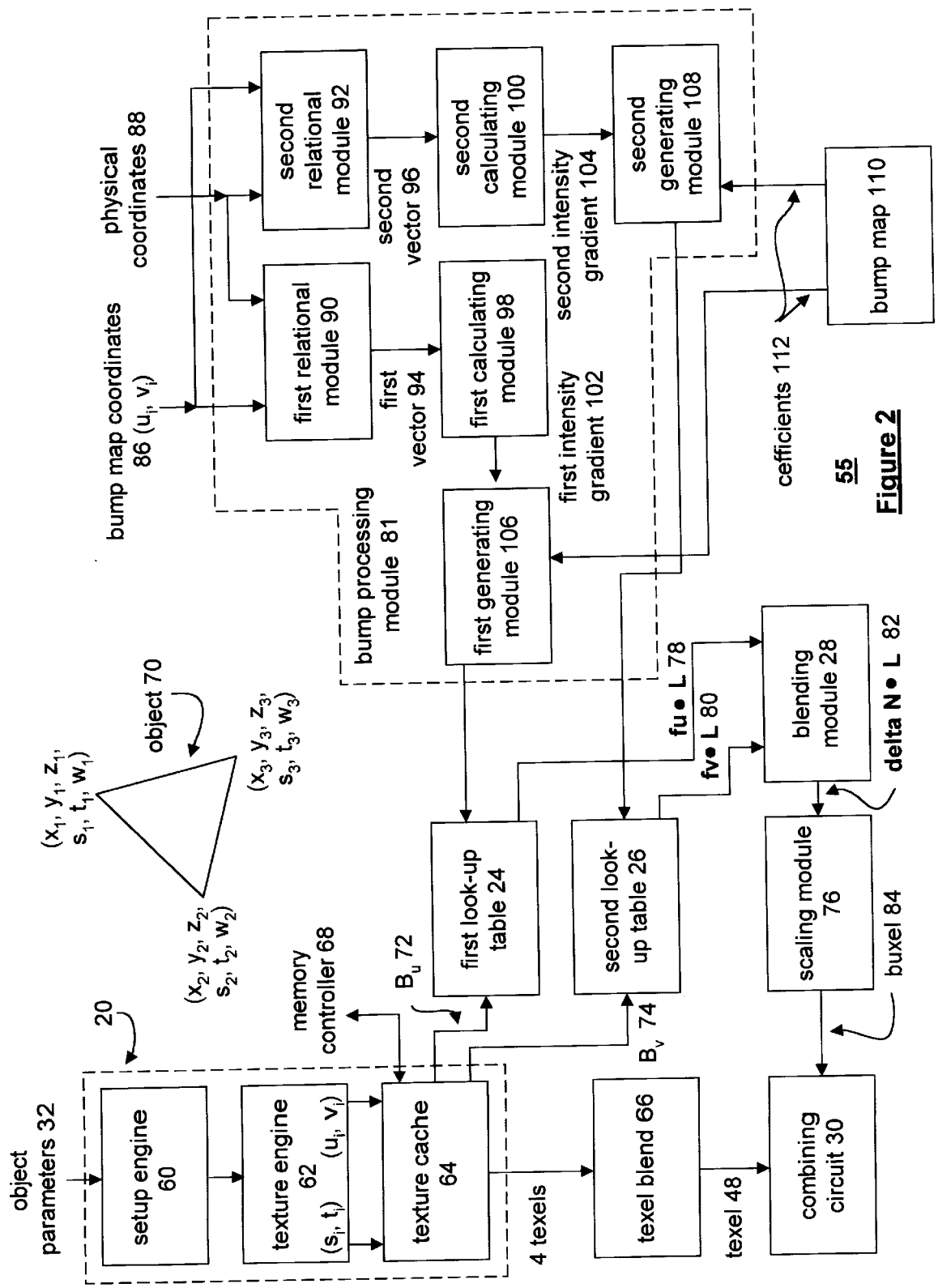
FIG. 2 illustrates a schematic block diagram of a video graphics circuit in accordance with the present invention.

FIG. 2 illustrates a schematic block diagram of an alternate video graphics circuit 55. The video graphics circuit 55 includes the object processing module 20, the first and second lookup tables 24 and 26, the blending module 28, and the combining circuit 30. In addition, the video graphics circuit 55 includes a texel blending module 66, a scaling module 76, a bump map 110, and a bump processing module 81. The object processing module 20 includes a set up engine 60, a texture engine 62, and texture cache 64. The setup engine 60 is operable to receive the object parameters 32 and to provide corresponding object parameters for each pixel of object 70 as the object is rendered. As shown, object 70 includes object parameters at each vertex, wherein the object 70 is shown as a triangle. The first vertex of object 70 includes physical display coordinates $x_1$, $y_1$, $z_1$, and also includes texel and bump map coordinates $s_1$, $t_1$, $w_1$. Vertexes 2 and 3 contain physical coordinates $x_2$ $y_2$, $z_2$, and $x_3$ $y_3$, $z_3$, and texel/bump map coordinates $s_2$, $t_2$, $w_2$ and $s_3$, $t_3$ and $w_3$, respectively.

From the object parameters 32, the set-up engine 60 walks the object 70 and provides corresponding object parameters for each pixel to the texture engine 62. The texture engine 62 derives texture coordinates and bump map coordinates from the object parameters at a given pixel. The texture coordinates are represented by $(s_i, t_i)$, while the bump map coordinates are represented by $(u_i, v_i)$. The texture coordinates for the given pixel and the bump map coordinates for the given pixel are provided to the texture cache 64. A memory controller 68 utilizes these coordinates to retrieve a set of texels 47, which is provided to a texel blending module 66. In addition, the memory controller 68 provides the bump map coordinates to the coefficient determiner 22 (not shown in FIG. 2), which retrieves a first and second coefficient $B_u$ 72, and $B_v$ 74 and stores the coefficients in the cache 64. The memory controller 68 causes the first and second coefficients 72 and 74 to be read from the cache 64 and provided to the first and second look-up tables 24 and 26, respectively. Similarly, the set of texels 47 retrieved from the texture map are temporarily stored in the texture cache 64 until needed by the texel blending module 66. Note that the video graphics circuit may process the pixels of the object in a pipeline fashion, which requires the texels, color, and bump map processing to be done in a synchronous manner.

The first look-up table 24 retrieves a first bump intensity value 78 ($B_u \times (fu \cdot L)$) based on the first coefficient 72. The second look-up table retrieves a second intensity value 80 ($B_v \times (fv \cdot L)$) based on the second coefficient 74. The first and second bump intensity values 78 and 80 are then provided to the blending module 28, which produces =the bump intensity value 82 ($\Delta N \cdot L$). Note that the first look-up table 24 may provide as set of first intensity values to the blending circuit 28, wherein the blending circuit blends the set of first intensity values into the first intensity value 78. Similarly, the second look-up table 26 may provide a set of second intensity values to the blending circuit 28, which blends the set into the second intensity value 80.

The scaling module 76 receives the resulting bump intensity value, or bump shading function, 82 and scales it to produce a scaled buxel 84. The magnitude of scaling varies the final appearance of the rendered object. If the resulting bump intensity value 82 is substantially scaled, the object will have minimum roughness. If, however, the scaling module provides little or no scaling, the rendered object will have a very rough appearance. The scaling module 76 provides the buxel 84 to the combining module 30, which combines the buxel 84 with the texel 48 to produce the display data 50.

In general, the bump processing module 81 generates a plurality of first bump intensity values and a plurality of second bump intensity values for the object 70. The plurality of first bump intensity values are stored in the first lookup table 24 while the plurality of second bump intensity values are stored in the second look-up table 26. Note that for each new object being rendered, the first and second look up tables 24 and 26 are updated for the new object.

The bump processing module 81 includes a first relational module 90, a second relational module 92, a first calculating module 98, a second calculating module 100, a first generating module 106, and a second generating module 108. The first and second relational modules 90 and 92 are operably coupled to receive bump map coordinates 86, which are represented by $u_i$, $v_i$, and physical coordinates 88 of the object 70. From this information, the first relational module 90 generates a first vector 94, which correlates an axis (the U axis) of the bump map to the plane of the object, where the first vector 94 (fu) is derived with respect to the fixed coordinates of the display. Similarly, the second relational module 92 generates a second vector 96 (fv), which correlates a second axis (the V axis) of the bump map 110 to the plane of the object, where the second vector 96 is derived with respect to the fixed coordinates of the display.

The first calculating circuit 98 receives the first vector 94 and produces therefrom a first intensity gradient 102 (fu·L). The second calculating module 100 generates a second intensity gradient 104 (fv·L). Note that these are the only two vector calculations needed to perform the bump mapping process of an object. As such, the computational requirements of the present embodiment are substantial reduced in comparison with bump mapping circuits that calculate a bump vector, or bump shading function, for each pixel of the object.

The first generating module 106 receives the first intensity gradient 102 and multiplies it with a first plurality of coefficients ($B_u$) 112 to produce a plurality of first intensity values, which are stored in the first look-up table 24. The first plurality of coefficients may be normalized in the range of +/−1, thus, if eight bits are used to represent the coefficients, the coefficient range may be the binary equivalents of −128 to +127. As such, a coefficient near the center of the range (e.g., zero) would have a most negative light value, and a coefficient near the extremities of the range (e.g., −128, +127) will have a most positive light value. The second generating module 108 receives the second intensity value 104 and multiplies it with a second plurality of coefficients ($B_v$) 112 to produce a plurality of second intensity values, which are stored in the second look-up table 26. The second plurality of coefficients may be normalized in a similar manner as the first plurality of coefficients.

Figure 3:
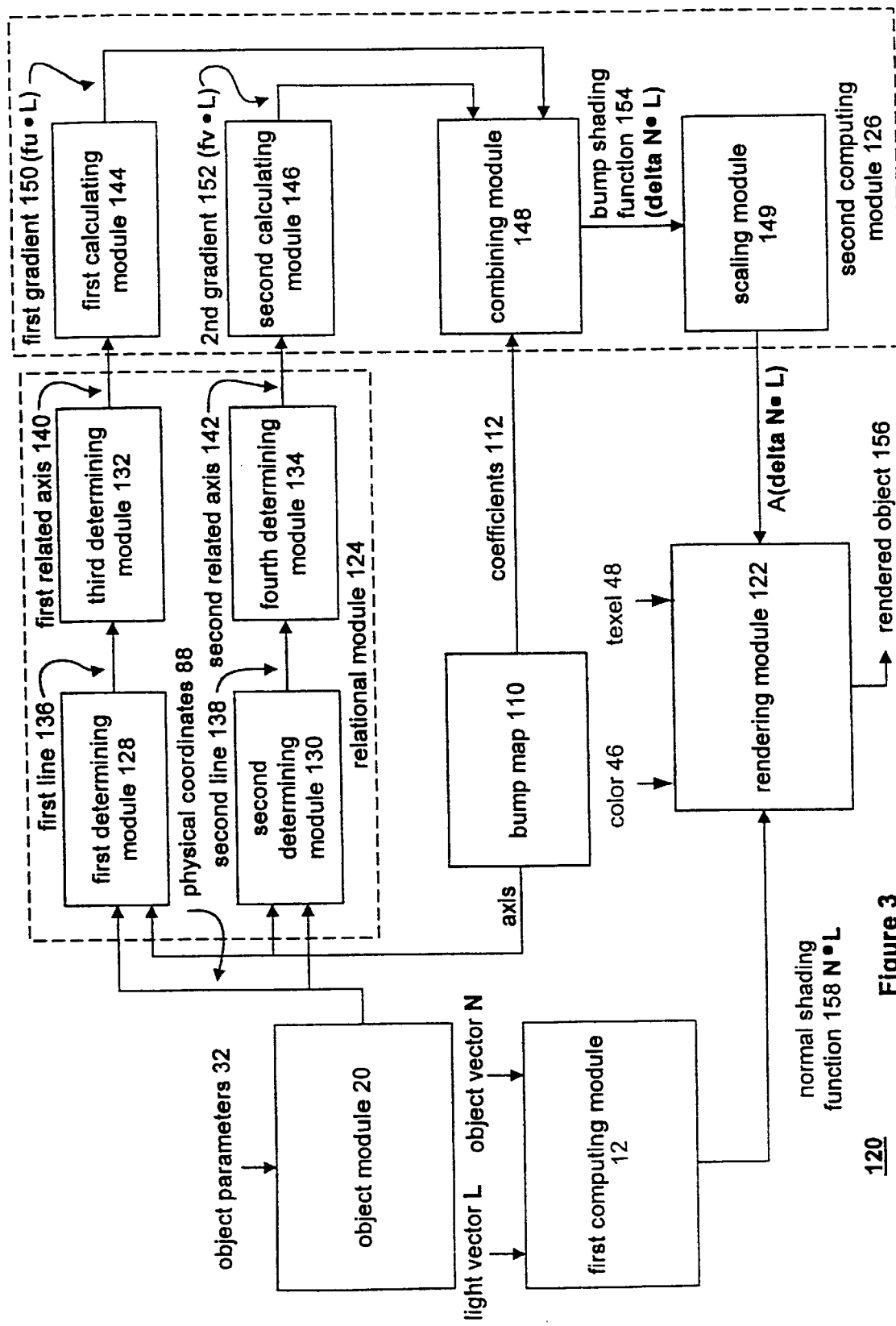
FIG. 3 illustrates a schematic block diagram of an alternate video graphics circuit in accordance with the present invention.

FIG. 3 illustrates another alternate embodiment of the video graphics circuit 120. The video graphics circuit 120 includes the object module 20, a relational module 124, a second computing module 126, a first computing module 121, the bump map 110 and a rendering module 122. The first computing module 121 receives a light vector L, which represents the vector of at least one light source relating to the graphical images to be displayed. The first computing module 121 also receives an object vector N, which represents the normal vector of the object being rendered. The first computing module 121 combines the vectors to produce a normal shading function 156 (N·L).

The relational module 124 includes a first determining module 128, a second determining module 130, a third determining module 132 and a fourth determining module 134. The first determining module 128 is operably coupled to receive physical coordinates 88 of the object from the object module 20 and to receive axis information of the bump map 110. Based on this information, the first determining module calculates a first line 136. In essence, the first line is a line created between two points obtained when any two sets of vertices of the triangle are extended with the v component set equal to zero.

The second determining module 130 is operably coupled to receive the physical coordinates 88 and a second axis of the bump map 110. The second determining module 130 utilizes these inputs to generate a second line 138. In essence, the second line 138 may be obtained by using any two sets of vertices of the object where the u value is set to zero. Thus, the two points determined from the vertices when u is zero provides the points for the second line.

The third determining module 132 receives the first line 138 and determines a first relative axis 140. Such a determination is made by picking a vector direction of the line and multiplying it by the vector of the triangle. If the resultant is a positive value, the correct vector direction was chosen. If, however, the resultant was negative, the vector direction is in the opposite of that initially chosen.

The fourth determining module 134 receives the second line 138 and produces therefrom a second related axis 142. A selected vector direction is applied to the second line and the selected vector is multiplied by the vector of the triangle. If the result is positive, the right vector direction was chosen. If, however, the resultant was negative, the vector direction chosen was incorrect and the opposite direction should be utilized. In this manner, the relational module 124 relates the U axis and the V axis of the bump map 110 to the fixed coordinates of the display based on the physical coordinates of the object. In other words, the relational module 124 places the bump map in the same plane, with respect to the fixed coordinates of the display, as that of the object being rendered. In general, the first, second, third and fourth determining modules 128–134 performs the following function:

Assume two vertices $V_a$ and $V_b$ are chosen, a point on the line u=0 can be obtained from $$\frac{1}{s_b - s_a} \left[ \left| \begin{matrix} x_a & x_b \\ s_a & s_b \end{matrix} \right| \quad \left| \begin{matrix} y_a & y_b \\ s_a & s_b \end{matrix} \right| \quad \left| \begin{matrix} z_a & z_b \\ s_a & s_b \end{matrix} \right| \right]^T$$

To obtain a point on the line v=0, all the s in the equation above are replaced with t. Next, given two points on the line u=0, the directional vector of the line can be obtained from the delta between the two points. Hence, two solutions result:

$$\pm \begin{bmatrix} x_b^{u=0} - x_a^{u=0} \\ y_b^{u=0} - y_a^{u=0} \\ z_b^{u=0} - z_a^{u=0} \end{bmatrix}$$

At this point it is unknown which is correct, but, by performing a dot product with some known vectors, the correct answer is obtained. For example, since the line u=0 defines the v axis, any two vertices with nonzero delta t may be taken to obtain the dot product $$sign(t_b - t_a) \begin{bmatrix} x_b - x_a \\ y_b - y_a \\ z_b - z_a \end{bmatrix} \cdot \begin{bmatrix} x_b^{u=0} - x_a^{u=0} \\ y_b^{u=0} - y_a^{u=0} \\ z_b^{u=0} - z_a^{u=0} \end{bmatrix}$$

If the result is positive, the chosen directional vector is in the positive direction. Otherwise it is pointing towards the negative direction, a simple negation is needed to bring it back to point to the positive side. Next, the resulting vector is normalized to bring it to unit length.

The second computing module 126 includes a first calculating module 124, a second calculating module 146, a combining module 148, and a scaling module 149. The first calculating module 144 is operably coupled to receive the first related axis 140 and to produce therefrom a first gradient 150. As such, the first calculating module performs a dot product calculation of the first related access 140 (fu) with the at least one light vector L. Similarly, the second calculating module 146 performs a dot product of the second related axis 142 (fv) with the light vector L.

The combining module 148 receives the first gradient 150 and the second gradient 152 along with the axis dependent coefficients 112 to produce a bump shading function 154 ($\Delta$N·L), or bump intensity value for a given pixel. The resulting bump shading function 154 may be provided directly to the rendering module 122 or scaled, by scaling module 149. In either case, the rendering module 122 produces, on a pixel by pixel basis, a rendered object 156 based on color information 46, texels 48 and the bump shading function 154, or a scaled representation thereof. Note that the relational module 124 the and first and second calculating modules 144 and 146 perform their function once for each object. The combining module 148 may perform its function on a pixel by pixel basis (i.e., in real time as the pixel is being processed), or it may create a plurality of first and second bump intensity values once per object and download the resultants to the first and second look up tables. In either case, the bump map is reoriented to be in the same plane as the object being rendered. With the bump map repositioned, the first and second gradients may be calculated once per object, and used to generate look-up tables to produce the resulting bump shading function. As such, the present invention substantially reduces the computational overhead of previous bump mapping techniques, thus making bump mapping feasible for commercial grade computer applications.

Figure 4:
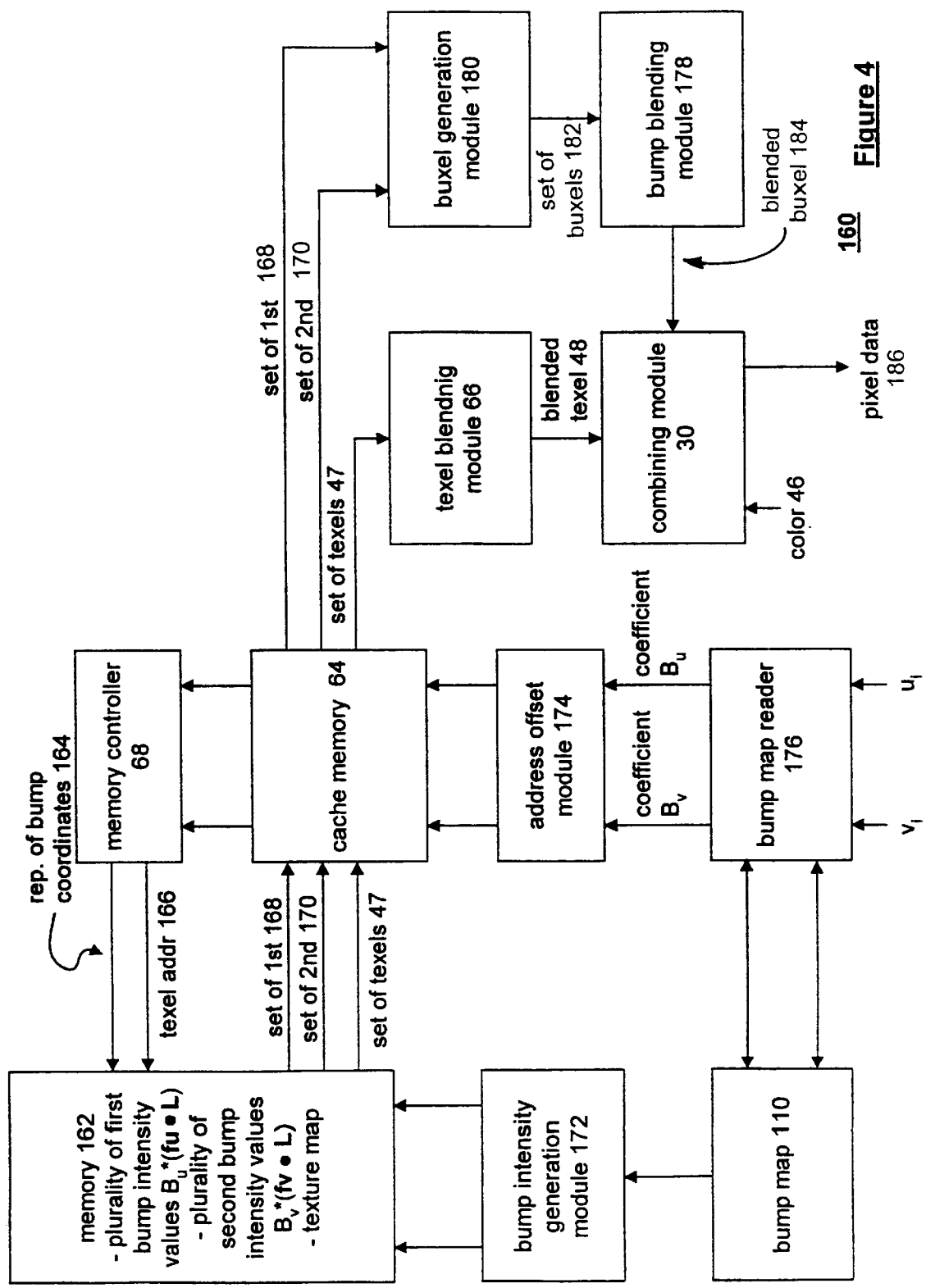
FIG. 4 illustrates a schematic block diagram of another alternate video graphics circuit in accordance with the present invention.

FIG. 4 illustrates a schematic block diagram of yet another video graphics circuit 160. The video graphics circuit 160 includes memory 162, a memory controller 68, the cache memory 64, an address offset module 174, a bump map reader 176, a bump intensity generation module 172, the bump map 110, the texel blending module 66, the combining module 30, a pixel generation module 180, and a bump blending module 178. The memory 162 stores the plurality of first bump intensity values, the plurality of second intensity values, and the texture map or maps. As such, the memory 162 may be part of the system memory 14, local memory to the video graphics circuit 160, cache memory, and/or a combination thereof.

The memory controller 68 causes the information to be read to and written from the memory 162. To obtain the set of texels from the memory for a given pixel of the object being rendered, the memory controller 68 provides a texel address 166 to memory 162. The set of texels is then provided to cache memory 64 where it is subsequently used by the texel blending module 66 to produce a blended texel 48. The memory controller 68 also provides a representation of bump coordinates 164 to the memory to retrieve a set of first bump intensity values 168 and a set of second bump intensity values 170. The representation of the bump coordinates 164 may be the axis dependent coefficients $B_v$ and $B_u$ which are obtained from the bump map 110 via the bump map reader 176. Alternatively, the representation of bump coordinates 164 may be the axis dependent coefficient $B_v$ and $B_u$ but have an address offset imposed by the address offset module 174. In either case, the axis coefficients are utilized to retrieve a set of first bump intensity values and a set of second bump intensity values, which are stored in the cache memory 64.

The bump intensity generation module 172 produces the plurality of first and second bump intensity values, which are stored in memory 162. The bump intensity generation module 172 generates the plurality of bump intensity values for a given object being rendered. As such the bump intensity generation module 172 may include similar circuitry to that of the relational module 124 and the second computational module 126 of the video graphics circuit of FIG. 3.

Having the set of first bump intensity values 168, and the set of second bump intensity values 170 stored in the cache memory, the buxel generation module 188 may retrieve them to produce a set of buxels 182. The buxel generation module 180 combines a first bump intensity value of the set of first bump intensity values with a corresponding second bump intensity value of the set of the second bump intensity values to obtain a first buxel. The buxel generation module 180 combines a second of the first bump intensity values with a second one of the second bump intensity values to obtain a second buxel. A third and fourth buxel are obtained in a similar manner to produce a set of buxels. The bump blending module 178 receives the set of buxels and blends them to produce a blended buxel 184.

The combining module 30 is operable coupled to receive the blended texel 48, the blended buxel 184, and color information 46 to generate pixel data 186. The format of the pixel data will depend on the display being driven by the video graphics circuit 160. For example, if the display is a CRT monitor, the pixel data 186 will be RGB data. If the display is an LCD display, the pixel data will be 3-bit RGB data and may be provided in a dual scan manner. Alternatively, if the display is a television, the pixel data will be YUV or YCrCb data.

As one of average skill in the art will readily appreciate, the video graphic circuits of FIGS. 1 through 4 may be implemented in software, hardware, or a combination thereof. In any implementation, the video graphics circuit substantially reduces the computational overhead required to perform bump mapping. The reduction in computational overhead results from normalizing the bump map to the same plane as the object being rendered. Having done this, a single dot product may be calculated for each axis and stored in a table such that for each pixel of the object being rendered, the bump shading function can be obtained by a table lookup as opposed to a computational intensive calculation.

Figure 5:
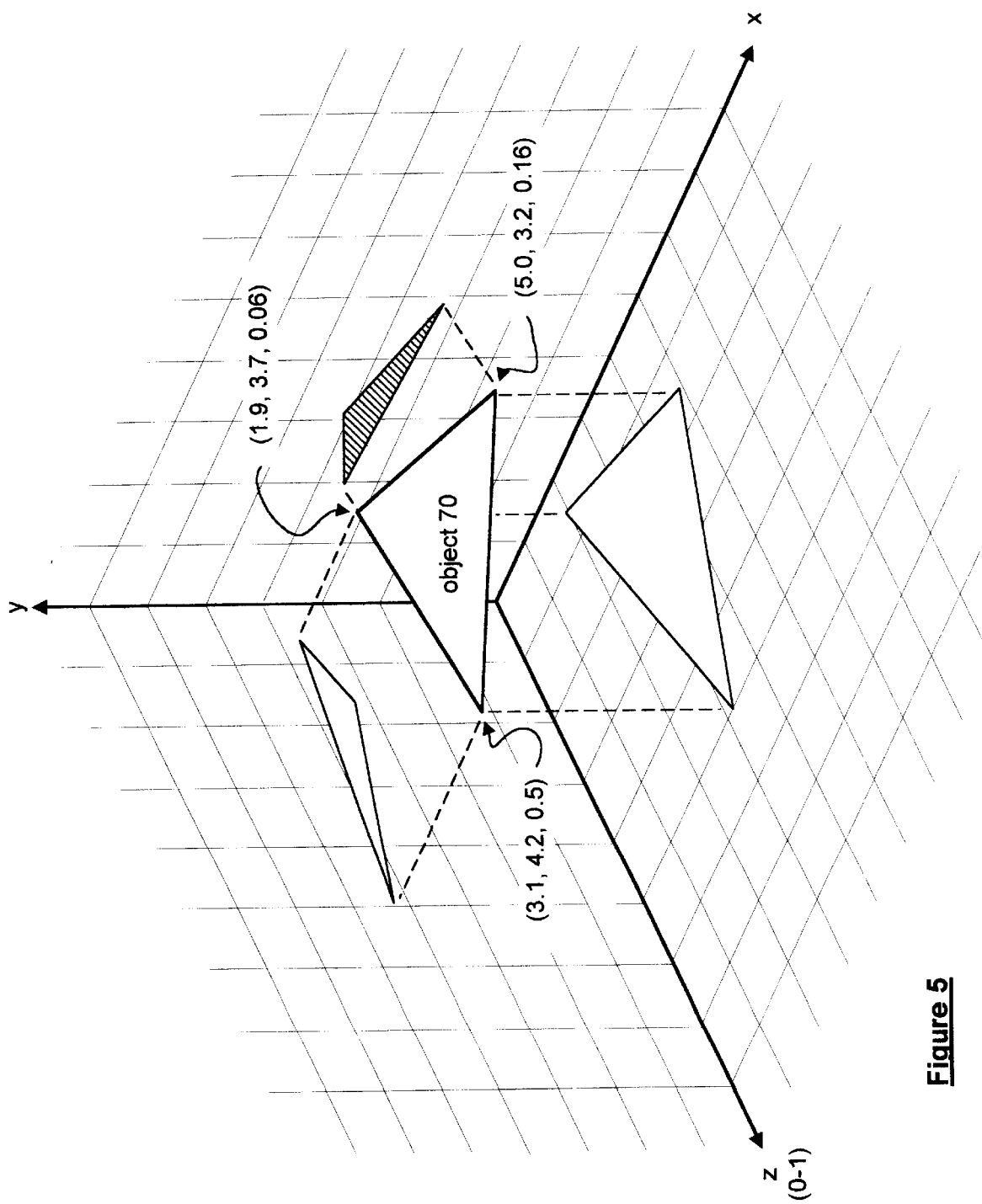
FIG. 5 illustrates a graphical representation of an object in fixed coordinate space of the display in accordance with the present invention.
Figure 6:
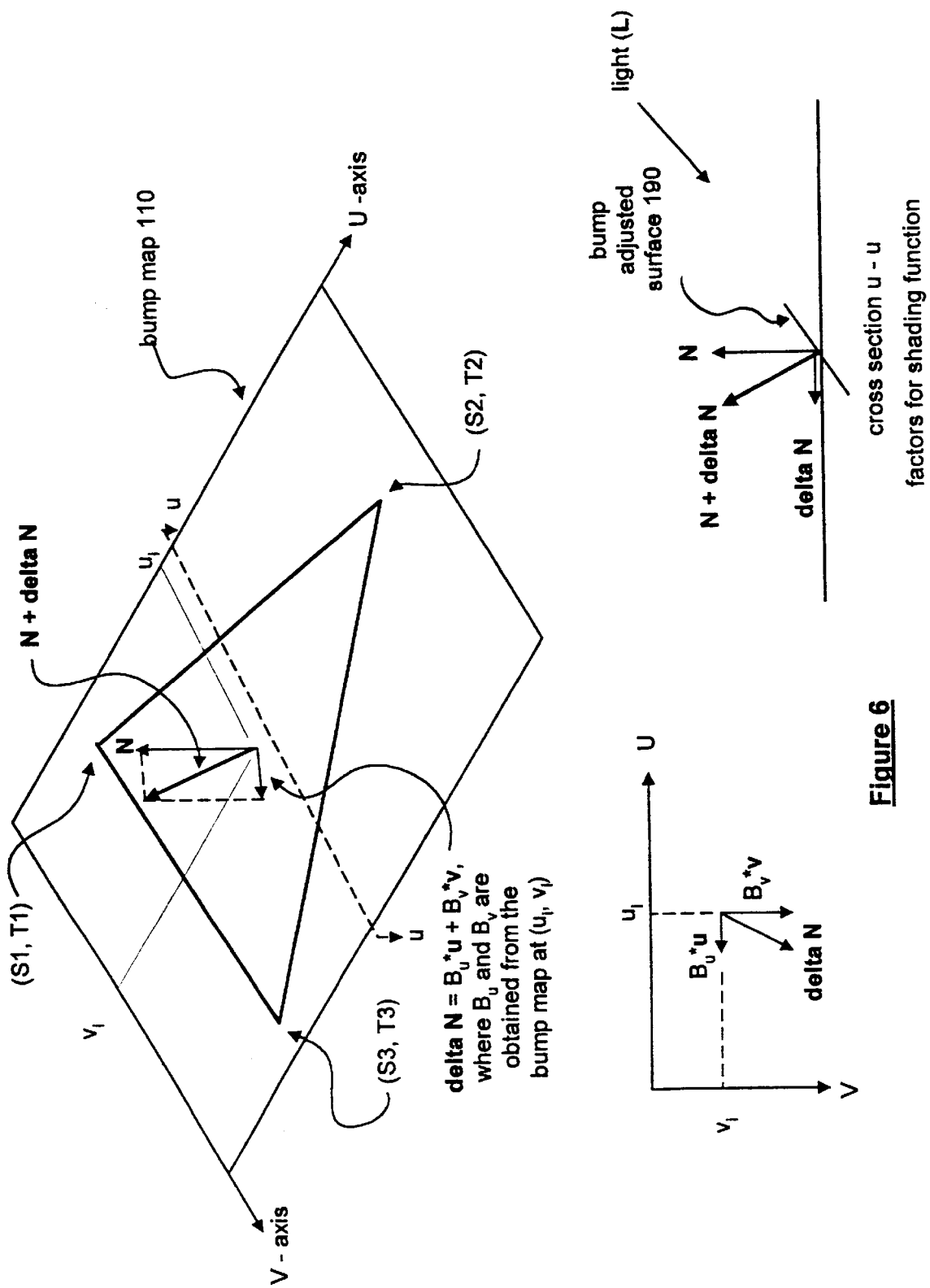
FIG. 6 illustrates a graphical representation of bump mapping in accordance with the present invention.
Figure 7:
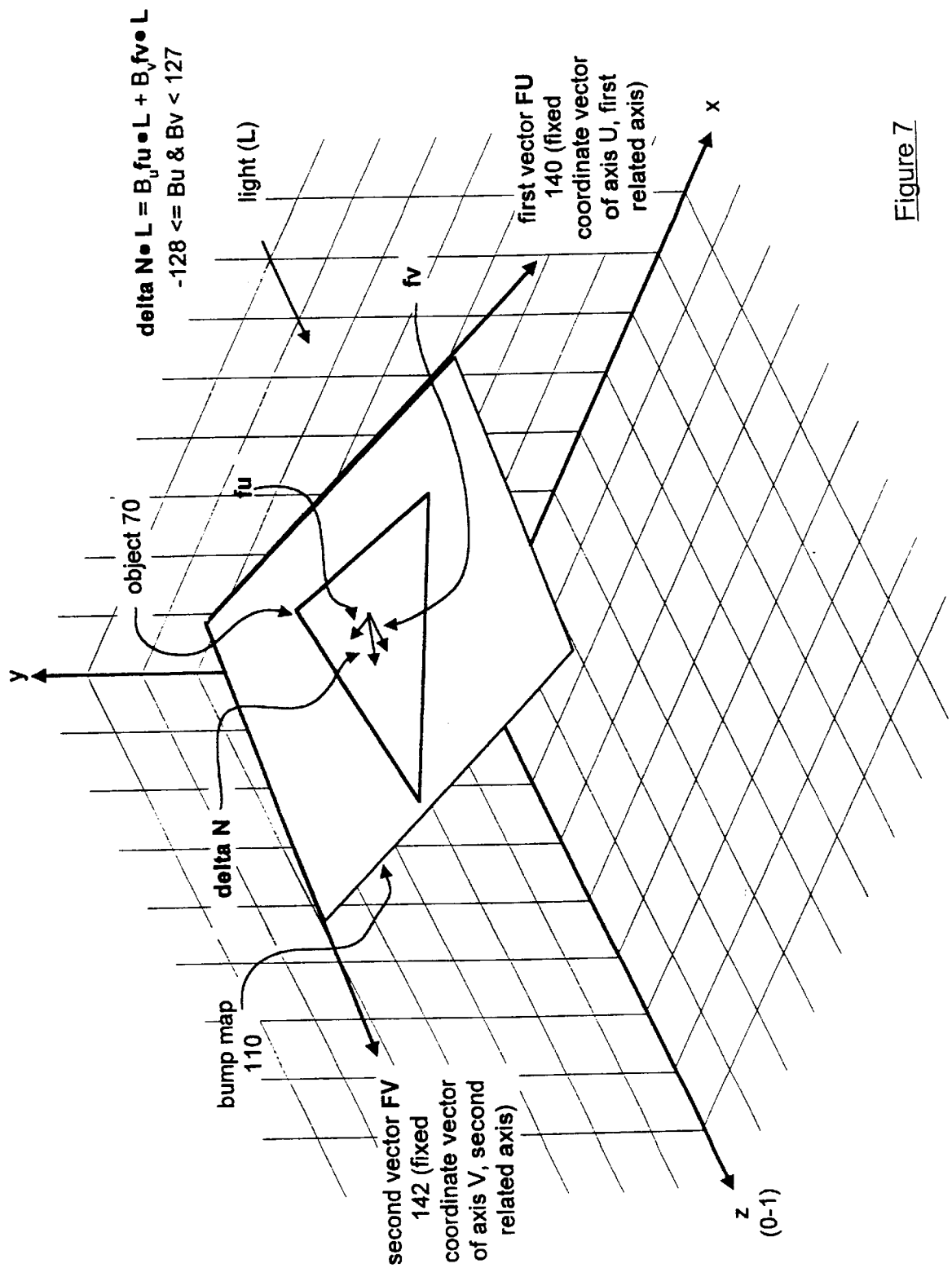
FIG. 7 illustrates a graphical representation of an object and bump map table in fixed space of the display which is in accordance with the present invention.

FIGS. 5 through 7 illustrate a graphical representation of an object being rendered in accordance with the present invention. FIG. 5 illustrates an object 70, which is shown as a triangle, being positioned in a three-dimensional space of the display. The three-dimensional space includes a set of fixed coordinates having an X-axis, a Y-axis and a Z-axis. The scale on the Z-axis is in the range of 0 to 1 while the scale on the X-axis and the Y-axis is dependent upon the pixel resolution of the display. For example, for a 640×480 display, the range of the X-axis will be from 0 to 639, while the range on the Y-axis will be from 0 to 479.

The three vertices of object 79 are shown to have the physical location of (1.9, 3.7, 0.06), (5.0, 3.2, 0.16), and (3.1, 4.2, 0.5). The image further includes a two-dimensional representation of the object as it would appear in two-dimensional space. For example, in the X-Y plane, the triangle is shown as the small shaded triangle, as it would be viewed from the positive Z direction. Similarly, the two-dimensional representation of the object 70 in the Y-Z plane is shown from the viewing perspective of the positive X-axis. The two-dimensional representation of the object in the X-Z plane is shown from the viewing perspective of the positive Y-axis.

FIG. 6 illustrates the bump map 110 having a U axis and a V axis where the object 70 is placed thereon. The positioning of object 70 on the bump map is dependent on the bump coordinates (S1, T1), (S2, T2) (S3, T3). The normal vector (N) of the object is shown to be perpendicular from the surface of the object 70. For a given pixel location of the object 70, the bump map coordinates up, vi are used to obtain the corresponding coefficients ($B_u$ and $B_v$). Having the coefficients, the bump shading function ($\Delta N$) may be obtained by equation $B_u \cdot u + B_v \cdot v$. Note that the illustration of the bump map 110 has not been repositioned to three-dimensional space of the display. Hence, the bump shading function is in terms of the vector u and the vector v, which are in the plane of the bump map 110. As one of average skill in the art will appreciate, with the bump shading function being in terms of the bump map, as is done in prior art implementations, the above equation needs to be performed and then further calculated to related it to the three dimensional space of the object for each pixel of the object.

The lower left drawing of FIG. 6 illustrates a two-dimensional representation of the bump shadow function. As shown, the $B_v \cdot u$ product is in the negative U direction, indicating that $B_u$ is a negative value. The $B_v \cdot v$ product is shown in the positive V direction indicating that $B_v$ is a positive value. The resulting vector $\Delta N$ is the summation of $B_v \cdot u$ and $B_v \cdot v$. As one of average skill in the art would readily appreciate, the coefficients $B_u$ and $B_v$ may vary in magnitude and sign such that the resulting bump vector $\Delta N$ can be in any direction and have any length with respect to the bump map coordinate ($u_i$, $v_i$).

The illustration in the lower-right portion of FIG. 6 represents the resulting bump adjusted surface 190. As shown, the normalized vector N of the object is summed with the $\Delta N$ vector of the bump surface to produce the resulting vector $N+\Delta N$. The resulting vector is perpendicular to the bumped surface. By performing a dot product with the light vector L and the resulting vector $N+\Delta N$ produces the desired shadowing function for this particular pixel location. Note that the resulting shadowing function is $L \cdot (\Delta N+N)$, which may be broken down into $L \cdot \Delta N$ and $L \cdot N$. As such, the $L \cdot N$ product is calculated once for the object and the $L \cdot \Delta N$ product may be obtained as previously described.

FIG. 7 illustrates a graphical representation of the bump map having its axis related to the plane of the object being rendered in terms of the fixed coordinates of the display. In this example, the first vector FU (i.e., the first related axis) 140 of the bump map is in terms of the fixed coordinates. Similarly, the second vector FV (i.e., the second related axis) 142 is in terms of the fixed coordinates. As a result of correlating the first and second axis of the bump map to the fixed coordinates of the three dimensional displayed space, the gradients of $fu \cdot L$ and $fv \cdot L$ are only calculated once. The coefficients are normalized to be +/−1, such that a plurality of first bump intensity values can be determined based on the equation $B_u^*(fu \cdot L)$, where $B_u$ ranges from −1 to +1, (e.g., for an 8 bit value, the range is −128 to 127). The plurality of second bump intensity values are determined based on the equation $B_v^*(fv \cdot L)$, where $B_v$ ranges from −1 to +1. The plurality of first and second bump intensity values are stored in the first and second look-up tables, which are addressed based on the coefficients ($B_u$, $B_v$). The coefficients are obtained from the bump map coordinates. Having obtained these values, the $\Delta N \cdot L$ product may be obtained from the sum of $B_u^*(fu \cdot L)$ and $B_v^*(fv \cdot L)$.

Figure 8:
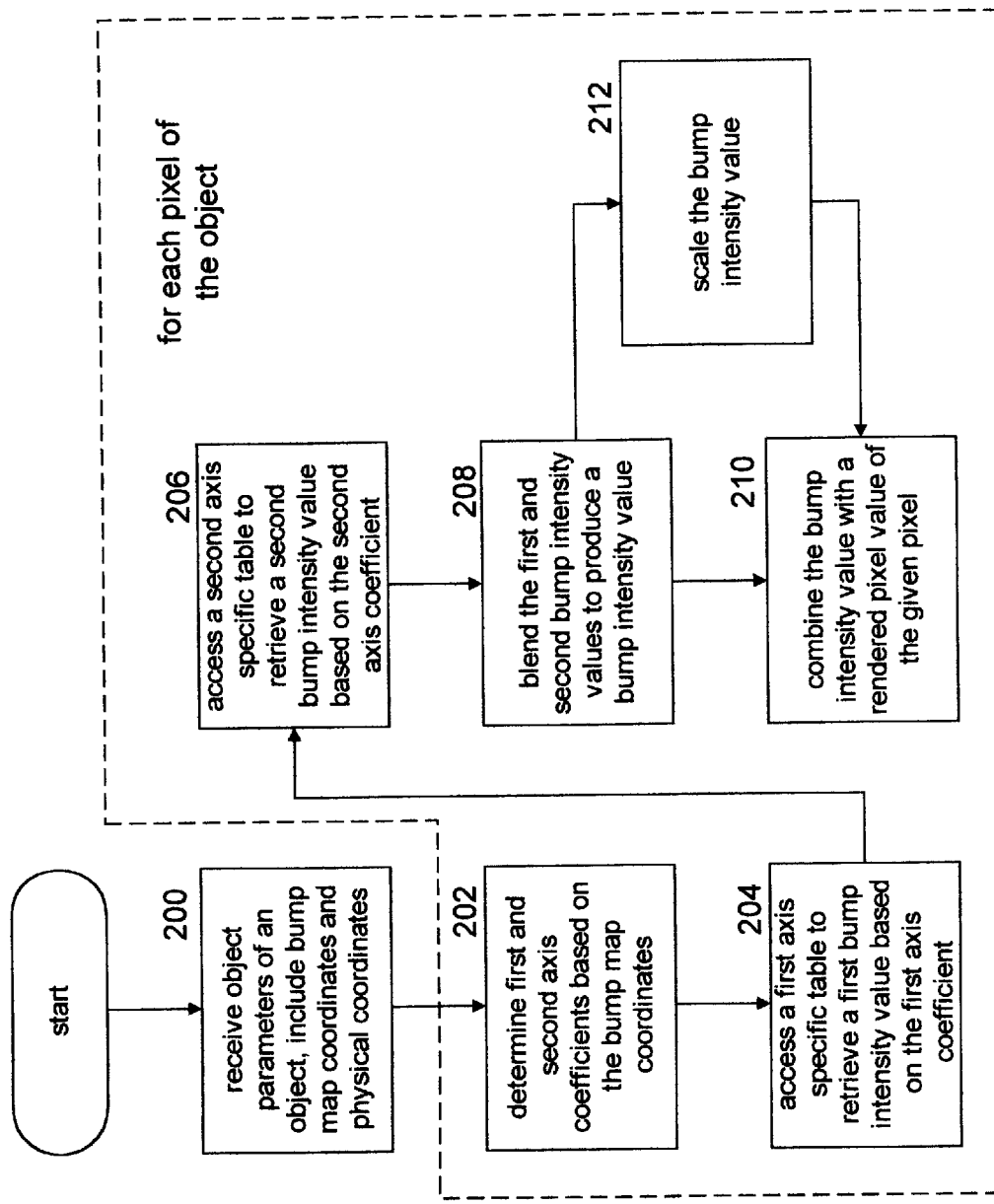
FIG. 8 illustrates a logic diagram of a method for processing bump mapping in accordance with the present invention.

FIG. 8 illustrates a logic diagram of a method for rendering an object that includes bump mapping. The process begins at step 200 where object parameters of an object are received. The object parameters include bump map coordinates and physical coordinates of the object. The process then proceeds to step 202 where a first and second axis coefficients are determined based on the bump map coordinates. The process then proceeds to step 204 where a first axis specific table is accessed to retrieve a first bump intensity value based on the first axis coefficient. In other words, the first access coefficient is used, or manipulated, to produce an address to access the first access specific table.

The process then proceeds to step 206 where a second axis specific table is accessed to retrieve a second bump intensity value based on the second axis coefficient. The process then proceeds to step 208 where the first and second bump intensity values are blended together to produce a bump intensity value. Having done this, the process may proceed to step 210 or to step 212. At step 212, the bump intensity value is scaled At step 210, the bump intensity value, or the scaled bump intensity value, is combined (e.g., added) with a rendered pixel value of the given pixel. The rendered pixel value includes a blended texel value and color information. Note that steps 202 through 212 are processed on a pixel by pixel basis, and are repeated for each pixel of the object being rendered.

Figure 9:
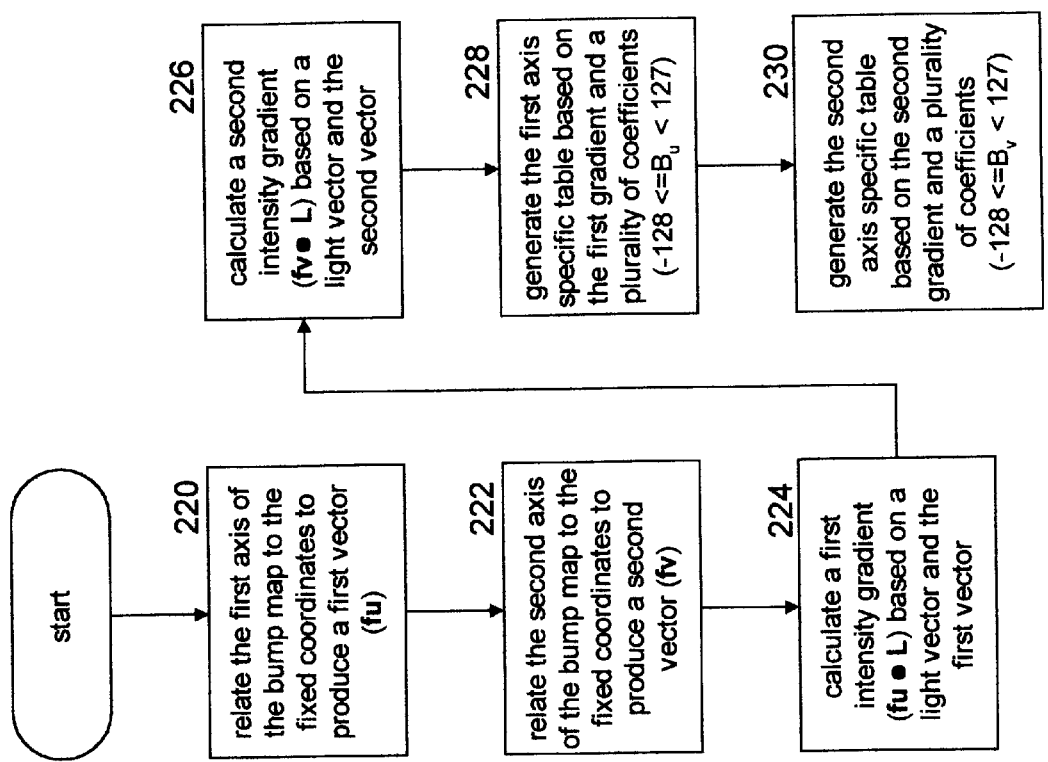
FIG. 9 illustrates a logic diagram of a method for determining a bump vector in accordance with the present invention.

FIG. 9 illustrates a logic diagram of a method for generating the data contained in the first and second axis specific tables. The process begins at step 220 where a first axis of the bump map is related to the fixed coordinates of the display to produce a first vector (FU). The process then proceeds to step 222 where a second axis of the bump map is related to the fixed coordinates to produce a second vector (FV). The process then proceeds to step 224 where a first intensity gradient (fu·L) is calculated based on a light vector and the first vector. The light vector is representative of at least one light source of image to be displayed.

The process then proceeds to step 226 where a second intensity gradient (fv·L) is calculated based on the light vector and the second vector. The process then proceeds to step 228 where the first axis specific table is generated based on the first gradient and a plurality of axis specific coefficients ($B_u$). The process then proceeds to step 230 where the second axis specific table is generated based on the second gradient and a plurality of axis specific coefficients ($B_v$). Note that the process of FIG. 9 is executed once per object and may be done in real time with the rendering of the object or done in advance of the rendering of the object, or further it may be predetermined and stored for a plurality of plane orientations.

Figure 10:
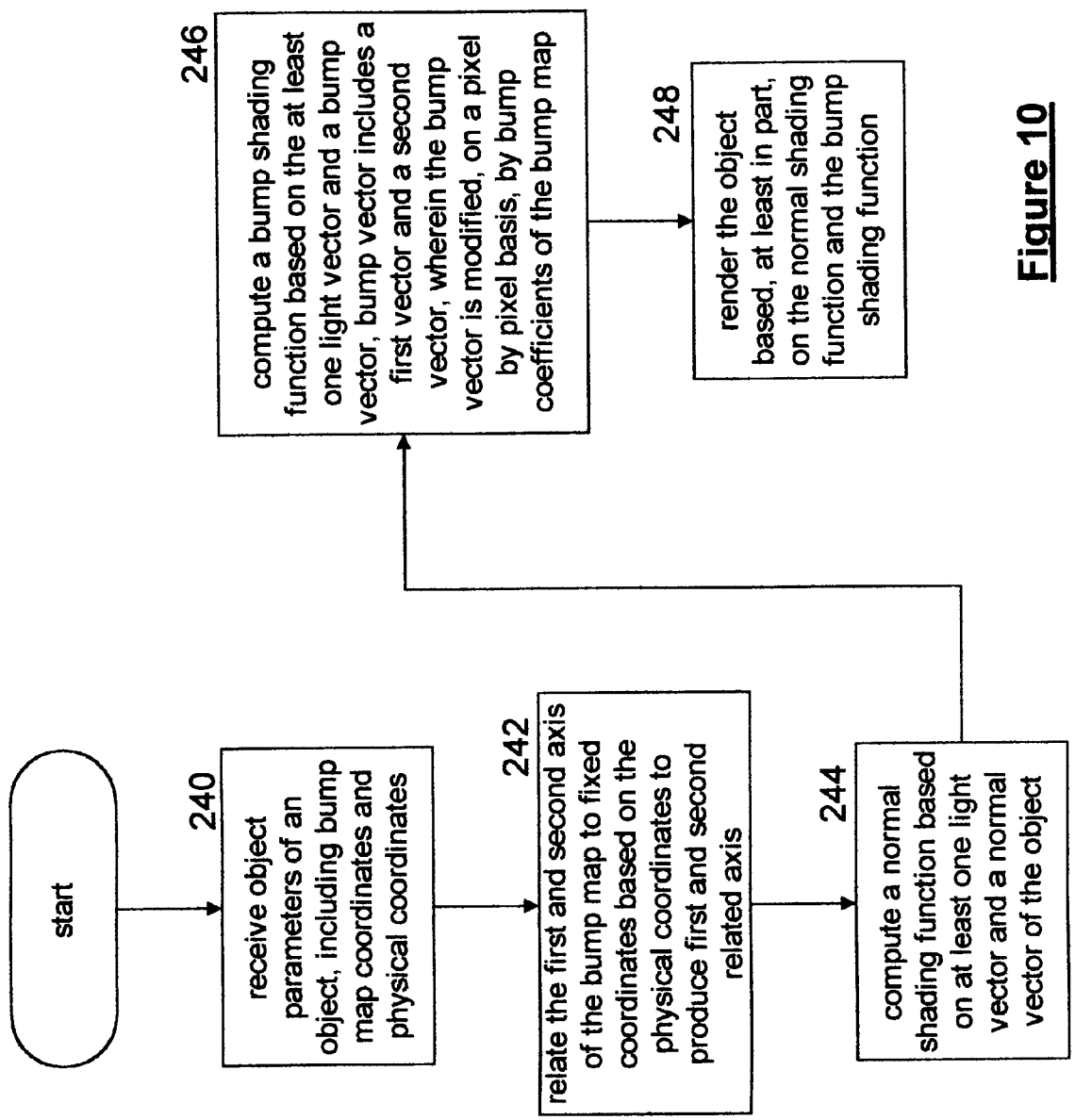
FIG. 10 illustrates a logic diagram of an alternate method for processing bump mapping in accordance with the present invention.

FIG. 10 illustrates a logic diagram of an alternate method for rendering an object having a bump texture. The process begins at step 240 where object parameters of an object are received. The object parameters include bump map coordinates and physical coordinates. The process then proceeds to step 242 where the first and second axis of the bump map are related to fixed coordinates of the display based on the physical coordinates of the object. The resultant is a first related axis and a second related axis.

The process then proceeds to step 244 where a normal shading function is computed based on at least one light vector and a normal vector of the object. The process then proceeds to step 246 where a bump shading function is computed based on the at least one light vector and a bump vector. The bump vector includes a first vector and a second vector, wherein the bump vector is modified, on a pixel by pixel basis by bump coefficients contained within the bump map. The process then proceeds to step 248 where the object is rendered based on at least in part the normal shading function and the bump shading function.

The preceding discussion has presented a method and apparatus for rendering an object having bump mapping with reduced computational overhead. The reduction in computational overhead results from normalizing the axis of the bump map to the plane of the object being rendered. As one of average skill in the art would readily appreciate, other embodiments than the ones discussed may be derived from the teachings of the present invention without deviating from the scope and spirit of the present invention. In particular, any circuitry, software, or a combination thereof that performs the following functions would be within the scope of the present invention.

What is claimed is:

1. A method for rending an object to have a bump texture, the method comprises the steps of:
    a) receiving object parameters of the object, wherein the object parameters include at least one of: bump mapping coordinates and physical display coordinates;
    for a given pixel of the object:
    b) determining a first axis coefficient and a second axis coefficient based on the bump mapping coordinates, wherein a bump map includes a first axis and a second axis;
    c) accessing a first axis specific table based on the first axis coefficient to retrieve a first bump intensity value;
    d) accessing a second axis specific table based on the second axis coefficient to retrieve a second bump intensity value;
    e) blending the first and second bump intensity values to produce a bump intensity value; and
    f) combining, the bump intensity value with a rendered pixel value of the given pixel.

2. The method of claim 1 further comprises, prior to step (a), generating the first and second axis specific tables.

3. The method of claim 2 further comprises:
    relating the first axis of the bump map to fixed coordinates to produce a first vector, wherein the first vector is of the fixed coordinates;
    relating the second axis of the bump map to the fixed coordinates to produce a second vector, wherein the second vector is of the fixed coordinates;
    calculating a first intensity gradient based on a light vector and the first vector;
    calculating a second intensity gradient based on the light vector and the second vector;
    generating the first axis specific table based on the first intensity gradient and a plurality of first axis coefficients; and
    generating the second axis specific table based on the second intensity gradient and a plurality of second axis coefficients.

4. The method of claim 1 further comprises scaling the bump intensity value prior to step (f).

5. The method of claim 1, wherein the bump intensity value is in a range of a most negative light value to a most positive light value.

6. The method of claim 1, wherein steps (c) and (d), further comprises calculating a memory address for each of the first and second axis specific tables based on the first and second axis coefficients and first and second table offset addresses, respectively.

7. The method of claim 6, wherein steps c) and (d) further comprises retrieving the first and second bump intensity values from at least one of: cache memory, local memory and system memory based on the memory addresses.

8. The method of claim 1, wherein the rendered pixel value includes blended texel values and color information.

9. The method of claim 1, wherein step (f) further comprises adding the rendered pixel value with the bump intensity value.

10. A method for rendering an object to have a bump texture, the method comprises the steps of:
    a) receiving object parameters of the object, wherein the object parameters include bump mapping coordinates and physical display coordinates, and wherein the bump mapping coordinates correlate to a bump map having a first axis and a second axis;
    b) relating the first and second axis to fixed coordinates based on the physical coordinates to produce a first related axis and a second related axis;
    c) computing a normal shading function based on at least one light vector and a normal vector of the object;
    d) computing a bump shading function based on the at least one light vector and a bump vector ($\Delta N$) of the object, wherein the bump vector has a first vector component corresponding to the first related axis and a second vector component corresponding to the second related axis; and e) rendering the object based, at least in part, on the normal shading function and the bump vector modified, on a pixel by pixel basis, by bump coefficients, wherein the bump coefficients are obtained from the bump map in accordance with the bump mapping coordinates.

11. The method of claim 10, wherein step (b) further comprises:
determining a first line based on the physical coordinates where a first coordinate of the bump mapping coordinates is zero,
determining a second line based on the physical coordinates where a second coordinate of the bump mapping coordinates is zero;
determining the first related axis from the first line and the physical coordinates; and
determining the second related axis from the second line and the physical coordinates.

12. The method of claim 10, wherein step (d) further comprises:
calculating a first intensity gradient based on the at least one light vector and the first vector component;
calculating a second intensity gradient based on the at least one light vector and the second vector component; and
combining the first and second intensity gradients to produce the bump shading function.

13. The method of claim 10 further comprises:
generating a first axis specific table based on the first vector component, the at least one light vector, and a plurality of first axis coefficients of the bump coefficients;
generating a second axis specific table based on the second vector component, the at least one light vector, and a plurality of second axis coefficients of the bump coefficients; and
accessing, on the pixel by pixel basis, the first and second axis specific tables to produce the bump vector modified by the bump coefficients.

14. The method of claim 10, wherein step (d) further comprises scaling the bump shading function.

15. The method of claim 10, wherein step (e) further comprises rendering the object based on blended texel values and color information.

16. A video graphics circuit including bump mapping, the video graphics circuit comprises:
object processing module operably coupled to receive object parameters of an object, wherein the object parameters include physical coordinates of the object, bump mapping coordinates of the object, and presentation criterion (texture, color, alpha blending, z value, etc.) of the object;
coefficient determiner operably coupled to the object processing module, wherein the coefficient determiner receives the bump mapping coordinates for a given pixel of the object and determines therefrom a first axis coefficient and a second axis coefficient, wherein a bump map includes a first axis and a second axis;
first look-up table operably coupled to the coefficient determiner, wherein the first look-up table stores a plurality of first bump intensity values and wherein the first look-table retrieves one of the plurality of first bump intensity values based on the first axis coefficient;
second look-up table operably coupled to the coefficient determiner, wherein the second look-up table stores a plurality of second bump intensity values and wherein the second look-table retrieves one of the plurality of second bump intensity values based on the second axis coefficient; and
blending module operably coupled to blend the one of the plurality of first bump intensity values with the one of the plurality second bump intensity values to produce a bump intensity value.

17. The video graphics circuit of claim 16 further comprises a combining module operably coupled to combine the bump intensity value with a rendered pixel data for the given pixel, wherein the rendered pixel data is produced by the object processing circuit based on the presentation criterion.

18. The video graphics circuit of claim 16 further comprises a bump processing module operably coupled to receive the bump mapping coordinates and the physical coordinates, wherein the bump processing module generates the plurality of first bump intensity values and the plurality of second bump intensity values.

19. The video graphics circuit of claim 18, wherein the bump processing module further comprises:
a first relational module operable to relate a first axis of a bump map to fixed coordinates to produce a first vector, wherein the first vector is of the fixed coordinates,
a second relational module operable to relate a second axis of the bump map to the fixed coordinates to produce a second vector, wherein the second vector is of the fixed coordinates;
a first calculating module operable to calculate a first intensity gradient based on a light vector and the first vector;
a second calculating module operable to calculate a second intensity gradient based on the light vector and the second vector;
a first generating module operable to generate the first axis specific table based on the first intensity gradient and a plurality of first axis coefficients; and
a second generating module operable to generate the second axis specific table based on the second intensity gradient and a plurality of second axis coefficients.

20. The video graphics circuit of claim 16 further comprises a scaling module operably coupled to scale the bump intensity value.

21. A video graphics circuit including bump mapping, the video graphics circuit comprises:
object processing module operably coupled to receive object parameters of an object, wherein the object parameters include physical coordinates of the object, bump mapping coordinates of the object, and presentation criterion of the object, wherein the bump mapping coordinates correlate to a bump map having a first axis and a second axis;
relational module operable to relate the first and second axis to fixed coordinates based on the physical coordinates to produce a first related axis and a second related axis;
a first computing module operable to compute a normal shading function based on at least one light vector and a normal vector of the object;
a second computing module operable to compute a bump shading function based on the at least one light vector and a bump vector of the object, wherein the bump vector has a first vector component corresponding to the first related axis and a second vector component corresponding to the second related axis; and
a rendering module operable to render the object based, at least in part, on the normal shading function and the bump vector modified, on a pixel by pixel basis, by bump coefficients, wherein the bump coefficients are obtained from the bump map in accordance with the bump mapping coordinates.

22. The video graphics circuit of claim 21, wherein relational module further comprises:

a first determining module operable to determine a first line based on the physical coordinates where a first coordinate of the bump mapping coordinates is zero, a second determining module operable to determine a second line based on the physical coordinates where a second coordinate of the bump mapping coordinates is zero;

a third determining module operable to determine the first related axis from the first line and the physical coordinates; and a fourth determining module operable to determine the second related axis from the second line and the physical coordinates.

23. The video graphics circuit of claim 21, wherein the second computing module further comprises:

a first calculating module operable to calculate a first intensity gradient based on the at least one light vector and the first vector component;

a first calculating module operable to calculate a second intensity gradient based on the at least one light vector and the second vector component; and a combining module operable to combine the first and second intensity gradients to produce the bump shading function.

24. The video graphics circuit of claim 21 further comprises:

a first generating module operable to generate a first axis specific table based on the first vector component, the at least one light vector, and a plurality of first axis coefficients of the bump coefficients; and a second generating module operable to generate a second axis specific table based on the second vector component, the at least one light vector, and a plurality of second axis coefficients of the bump coefficients, wherein the first and second axis specific tables are accessed, on the pixel by pixel basis, to produce the bump vector modified by the bump coefficients.

25. The video graphics circuit of claim 21, wherein the second computing module further comprises a scaling module operable for scaling the bump shading function.

26. A video graphics circuit including bump mapping, the video graphics circuit comprises:

a memory controller operably coupled to receive a set of first bump intensity values from a plurality of first bump intensity values and a set of second bump intensity values from a plurality of second bump intensity values based on a representation of bump map coordinates of a given pixel of an object, the bump map coordinates including a first bump map coordinate for a first bump map axis and a second bump map coordinate for a second bump map axis, the first bump map coordinate relating to the set of the first bump intensity values and the second bump map coordinate relating to the set of the second bump intensity values, wherein the memory controller is further operably coupled to retrieve a set of texels based on texel coordinates of the given pixel, wherein the plurality of first bump intensity values and the plurality of second bump intensity values relates to the object;

a cache memory for temporarily storing the representation of the bump map coordinates, the set of first bump intensity values, the set of second bump intensity values, and the set of texels;

a texel blending module operably coupled to receive the set of texels and to produce therefrom a blended texel;

a buxel generation module operably coupled to receive the set of first bump intensity values and the set of second bump intensity values to generate therefrom a set of buxels;

a bump blending module operably coupled to receive the set of buxels and to produce therefrom a blended buxel; and a combining module operably coupled to receive the blended texel, the blended buxel, and color information and to produce therefrom pixel data for the given pixel.

27. The video graphics circuit of claim 26 further comprises memory operably coupled to the memory controller, wherein the memory stores the plurality of first bump intensity values and the plurality of second bump intensity values, wherein the memory is addressed based on the representation of bump map coefficients to retrieve the set of first bump intensity values and the set of second bump intensity values.

28. The video graphics circuit of claim 26 further comprises a bump map reader operably coupled to the cache memory, wherein the bump map reader reads a bump map based on the bump map coordinates to obtain a first coefficient and a second coefficient, wherein the first and second coefficients are provided to the cache memory as the representation of the bump map coordinates.

29. The video graphics circuit of claim 26, wherein the bump blending module further comprises a scaling module that is operable to scale the blended buxel.

30. A video graphics circuit including bump mapping, the video graphics circuit comprises a memory controller operably coupled to receive a set of first bump intensity values from a plurality of first bump intensity values and a set of second bump intensity values from a plurality of second bump intensity values based on a representation of bump map coordinates of a given pixel of an object, wherein the memory controller is further operable coupled to retrieve a set of texels based on texel coordinates of the given pixel, wherein the plurality of first bump intensity values and the plurality of second bump intensity values relates to the object;

a cache memory for temporarily storing the representation of the bump map coordinates, the set of first bump intensity values, the set of second bump intensity values, and the set of texels;

a texel blending module operably coupled to receive the set of texels and to produce therefrom a blended texel;

a buxel generation module operably coupled to receive the set of first bump intensity values and the set of second bump intensity values to generate therefrom a set of buxels;

a bump blending module operably coupled to receive the set of buxels and to produce therefrom a blended buxel;

a combining module operably coupled to receive the blended texel, the blended buxel, and color information and to produce therefrom pixel data for the given pixel; and a bump intensity generation module operable to produce the plurality of first bump intensity values and the second bump intensity values, wherein the bump intensity generation module includes:

a relational module operable to relate a first axis and a second axis of a bump map to fixed coordinates based on physical coordinates of the object to produce a first related axis and a second related axis;

a first computing module operable to compute a bump shading function based on at least one light vector and a bump vector of the object, wherein the bump vector has a first vector component corresponding to the first related axis and a second vector component corresponding to the second related axis; and a second computing module operable to compute the plurality of first bump intensity values and the plurality of second bump intensity values based on a plurality of coefficients and the bump shading function.

* * * * *